(12) United States Patent
Studer et al.

(10) Patent No.: US 10,023,430 B2
(45) Date of Patent: Jul. 17, 2018

(54) ELEVATOR SYSTEM ACTUATOR INCLUDING A RESETTING ELEMENT MADE FROM SHAPE MEMORY ALLOY

(71) Applicant: Inventio AG, Hergiswil (CH)

(72) Inventors: Christian Studer, Kriens (CH); Raphael Bitzi, Lucerne (CH)

(73) Assignee: INVENTIO AG, Hergiswil (CH)

( * ) Notice: Subject to any disclaimer, the term of this patent is extended or adjusted under 35 U.S.C. 154(b) by 102 days.

(21) Appl. No.: 15/106,325

(22) PCT Filed: Nov. 21, 2014

(86) PCT No.: PCT/EP2014/075224
§ 371 (c)(1),
(2) Date: Jun. 20, 2016

(87) PCT Pub. No.: WO2015/090840
PCT Pub. Date: Jun. 25, 2015

(65) Prior Publication Data
US 2017/0001834 A1 Jan. 5, 2017

(30) Foreign Application Priority Data

Dec. 19, 2013 (EP) .................................... 13198658

(51) Int. Cl.
*F03G 7/06* (2006.01)
*B66B 5/02* (2006.01)
*B66B 5/16* (2006.01)

(52) U.S. Cl.
CPC .................. *B66B 5/02* (2013.01); *B66B 5/16* (2013.01); *F03G 7/065* (2013.01)

(58) Field of Classification Search
CPC .................................. F03G 7/06; F03G 7/065
USPC ..................................................... 60/527–529
See application file for complete search history.

(56) References Cited

U.S. PATENT DOCUMENTS

| | | | | |
|---|---|---|---|---|
| 3,652,969 A | * | 3/1972 | Willson .................. | C22F 1/006 148/563 |
| 4,806,815 A | * | 2/1989 | Honma ................... | F03G 7/065 310/307 |
| 7,614,228 B2 | * | 11/2009 | Hamaguchi .............. | G03B 5/00 29/446 |
| 8,607,561 B2 | * | 12/2013 | Walls-Bruck ........... | F03G 7/065 60/527 |
| 9,599,099 B2 | * | 3/2017 | Li .......................... | F03G 7/065 |

(Continued)

FOREIGN PATENT DOCUMENTS

| | | |
|---|---|---|
| EP | 0854320 A1 | 7/1998 |
| WO | 2008144521 A1 | 11/2008 |
| WO | 2012080102 A1 | 6/2012 |

*Primary Examiner* — Laert Dounis
(74) *Attorney, Agent, or Firm* — William J. Clemens; Shumaker, Loop & Kendrick, LLP

(57) ABSTRACT

An actuator for an elevator system, which actuator can adopt an activated state and a released state, has a restoring element. The actuator is brought from the released state into the activated state by the restoring element. The restoring element is made of a shape memory alloy. At a first temperature, the restoring element adopts a first length, and a second length at a second temperature. After the actuator has been released, the restoring element changes from the first length into the second length, and back into the first length. In this way, the restoring element returns the actuator to the activated state.

15 Claims, 1 Drawing Sheet

(56) References Cited

U.S. PATENT DOCUMENTS

2011/0258931 A1   10/2011   Gao et al.
2014/0026554 A1*  1/2014    Browne ................. F03G 7/065
                                                      60/527

* cited by examiner

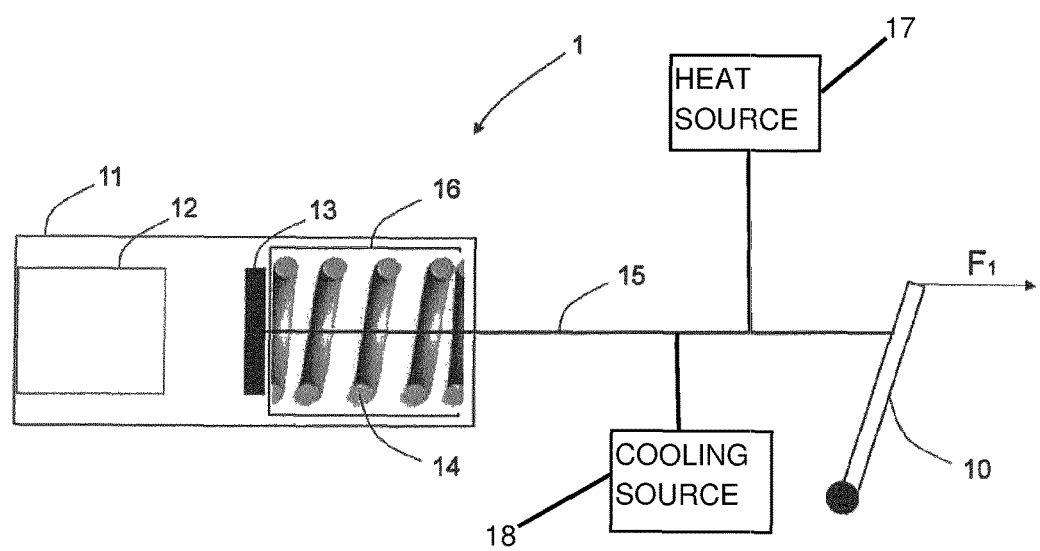
Fig. 1
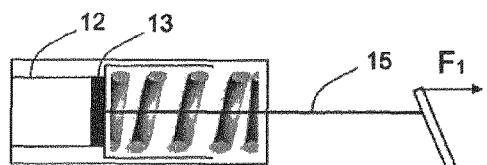
Fig. 2a
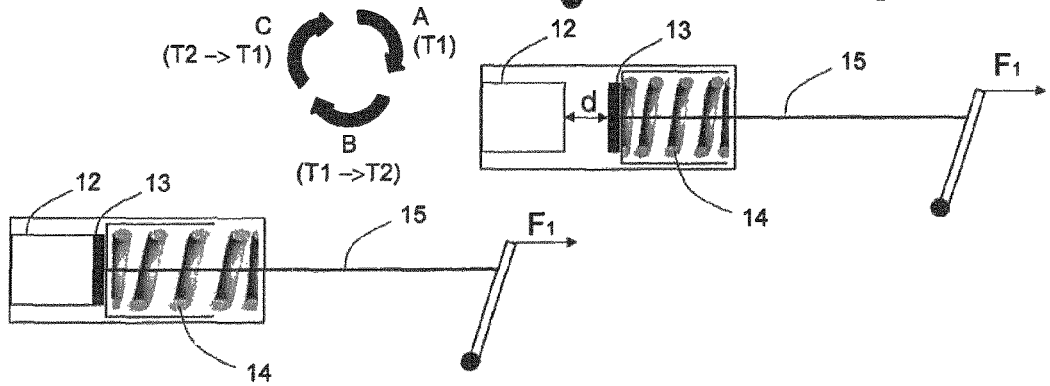
Fig. 2b
Fig. 2c

ELEVATOR SYSTEM ACTUATOR INCLUDING A RESETTING ELEMENT MADE FROM SHAPE MEMORY ALLOY

FIELD

The invention relates to a reliable actuator for an elevator installation and to a method for operating this actuator.

BACKGROUND

There are numerous uses in elevator construction for reliably actuable actuators for actuating safety brakes, door locks, door opening mechanisms or systems for providing temporary safe areas. Known solutions are usually based on electromechanical components such as, for example, spindle motors, stroke magnets and the like, by which an actuator is reliably actuable. Such components must, for considerations of pure safety engineering, operate very reliably, but have a relatively heavy weight and are relatively high consumers of energy. In addition, a relatively large amount of installation space has to be provided for installation thereof in an elevator system. Finally, a certain amount of noise output, which can prejudice the perceptible travel quality in the car interior, cannot be excluded. Improvement in weight and installation size, in particular, are factors which always receive a high level of attention from an expert in the design of an elevator installation.

SUMMARY

It is therefore an object of the invention to create an improved actuator for safe applications in an elevator installation, which actuator has, in particular, a relatively small installation size and a light weight.

An actuator, which can adopt an activated state and a triggered state, for an elevator installation preferably comprises a resetting element. The actuator can be brought from the triggered state to the activated state by means of this resetting element. In that case, the resetting element is made from a shape memory alloy. The resetting element takes on a first length at a first temperature and a second length at a second temperature. The resetting element is designed for the purpose of changing from the first length to the second length and back to the first length after triggering of the actuator. In that case, the resetting element resets the actuator to the activated state.

By "shape memory alloy" there is to be understood a metal having the capability of regaining its original shape after a significant deformation. This 'memory effect' is due to the characteristic that such metals can exist in two different crystal structures. The shape transformation is based on a temperature-dependent lattice transformation from an austenitic phase to a martensitic phase or a high-temperature phase to a low-temperature phase. The two phases can transfer from one to the other through a temperature change. The temperatures for the shape transformation can be set in a wide range depending on the respectively selected composition of the alloy. Alloys based on titanium and nickel such as, for example, NiTi or nitinol are well-established in practice thanks to their well-balanced characteristics.

Moreover, by "length" there can be understood in terms of meaning a dimension of the resetting element in which a body such as, for example, a wire, rod or the like has a greater extent than, for example, a width. However, in the context of the invention there shall also be understood by "length" the length of any dimension of whatever body which depending on temperature can have a dimensional difference sufficient to reset the actuator.

It is advantageous that the resetting element of shape memory alloy functions extremely efficiently. The specific work output thereof exceeds that of other actuator materials by multiple. Accordingly, the resetting element or the actuator can be made to be very compact and light. In addition, the change in length of the resetting element is totally free of noise and makes a substantial contribution to improvement in perceived travel comfort.

The first length is preferably dimensioned to be shorter than the second length of the resetting element.

In a particularly preferred embodiment the resetting element is of wire-shaped form. The diameter of a wire can vary, depending on how large the force is to be dimensioned, in order to reset an actuator. Several wires of a shape memory alloy arranged in parallel can also be provided.

The actuator preferably comprises a retainer and an armature, which in an activated state of the actuator can be retained at the retainer against a tension force, in which case the resetting element transmits the tension force to the armature. With particular preference the retainer acts magnetically. For example, this retainer is designed as an electromagnet. The armature for its part is, with particular preference, made from a ferromagnetic material. In an activated state of the actuator the electromagnet is supplied with current and holds the armature in an active rest setting. The attraction force between the retainer and the armature in the activated state of the actuator is always greater than the tension force.

Alternatively thereto the retainer can also act electromechanically. For that purpose the retainer comprises a hook. The armature is preferably designed as an eye in which the hook can engage. In an activated state of the actuator the retainer is supplied with current, in which case the hook can be held by the retainer in a first position in which the hook engages in the eye of the armature and thus retains this against the tension force. Conversely, in the triggered state the retainer is no longer supplied with current. In that case, the hook of the retainer adopts a second position in which this releases the eye of the armature.

By "active rest setting" there is to be understood a rest setting in which the actuator holds, for example, a safety brake in an open setting. As soon as the current supply to the retainer is interrupted, the armature is released by the retainer. Accordingly, the armature is drawn away from the retainer in the direction of the tension force and activates the safety brake. In that regard it is of particular advantage that the actuator is designed to be fail-safe.

The armature in a released state of the actuator is preferably releasable from the retainer in the direction of the tension force.

The length of the resetting element is preferably variable, in particular extendable, in such a way that the armature after triggering of the actuator can be brought back into operative contact with the retainer. With particular preference the actuator in that case comprises a restoring spring by which the armature can be brought into operative contact with the retainer.

The restoring force of the restoring spring is smaller than the tension force so as to ensure reliable actuation of the actuator. The restoring force of the restoring spring is set in such a way that this is sufficiently high to tension the resetting element in the second length and accordingly bring it into operative contact with the retainer.

The first temperature is preferably higher than the second temperature, in which case the first length of the resetting element is achievable by heating the resetting element. With particular preference the first temperature lies above the ambient temperature of the resetting element, particularly above 50° C. The ambient temperature, for example in the shaft of an elevator installation, can fluctuate within a certain bandwidth. This circumstance is to be taken into account insofar as the first temperature is predetermined in such a way that it is always higher than a maximum preset ambient temperature for normal operation. A maximum acceptable temperature for normal operation of an elevator installation is preset, for the design of the installation, by the approval authorities. In Europe this maximum preset temperature is 50° C. This temperature value can obviously be preset differently therefrom by approval authorities of other countries.

The actuator preferably comprises one of the following heat sources for heating the resetting element:
  an induction coil in which the resetting element is arranged,
  a heating coil in which the resetting element is arranged,
  connection of the resetting element as a resistor in a current circuit, and
  a medium able to be brought into contact with the resetting element.

In that regard it is advantageous that the resetting element in a triggered state of the actuator can achieve its second length even in the case of power interruption.

The medium can be in a gaseous, liquid or sold aggregate state, which for its part is heated by means of a heat source to an advantageous temperature sufficiently high for the resetting element to be able to be brought at least to the first temperature.

Alternatively, the second temperature is lower than an ambient temperature of the resetting element, in particular lower than −10° C. In that case, the second length of the resetting element is achievable by means of cooling the resetting element. The ambient temperature can fluctuate within a certain band width. This circumstance is to be taken into account in this alternative to the extent that the second temperature is predetermined in such a way that as to always be less than a minimum preset ambient temperature for normal operation. A minimum acceptable temperature for normal operation is preset, for the design of an elevator installation, by the approval authorities. In Europe this minimum preset temperature is −10° C. This temperature can obviously be preset differently therefrom by approval authorities of other regions or countries.

In an alternative embodiment the actuator can preferably comprise one of the following cooling sources for cooling the resetting element:
  a Peltier element connected with the resetting element, and
  a medium able to be brought into contact with the resetting element.

It is advantageous that in the alternative embodiment of the actuator the resetting element in the activated state of the actuator does not consume any energy, since the high-temperature phase or the first length of the resetting element is already present at ambient temperature, i.e. energy for the purpose of cooling the resetting element is applied so as to bring the resetting element to the second length.

By "Peltier element" there is understood an electrothermal transducer which generates a temperature difference based on Peltier effect when conducting current. The basis of Peltier effect is the contact of two semiconductors having a different energy level of the conductivity bands. In that respect, the n-doped semiconductor has a lower energy level than the p-doped semiconductor. If a current is conducted through two contact points, which lie one behind the other, of these materials then heat energy is taken up at the contact point from the n-doped to the p-doped semiconductor so that an electron passes to the higher-energy conductivity band of the adjacent semiconductor material. The contact point is correspondingly cooled.

The medium can be present in a gaseous, liquid or solid aggregate state, which for its part is cooled—by means of a cooling source or on the other hand by means of a change in aggregate state and accompanying extraction of heat—to an advantageous temperature sufficiently low for the resetting element to be able to be brought at least to the second temperature.

The armature is preferably connected with an armature guide by which the armature is guided within a housing. Accordingly, translational guidance can be achieved. In that regard it is advantageous that the armature is movable in defined manner from and to the retainer.

In a further aspect the invention relates to a method of operating the actuator and comprises the following steps:
A) triggering the actuator,
B) extending the length of the resetting element at the second temperature and
C) shortening the length of the resetting element at the first temperature so as to reset the actuator to the activated state.

DESCRIPTION OF THE DRAWINGS

The invention is better described in the following by way of embodiments, wherein:

FIG. 1 shows, schematically, the basic construction of the actuator in a cross-section;

FIG. 2a shows, schematically, a first state of the actuator in a switching cycle;

FIG. 2b shows, schematically, a second state of the actuator in the switching cycle; and FIG. 2c shows, schematically, a third state of the actuator in the switching cycle.

DETAILED DESCRIPTION

FIG. 1 shows a schematic illustration of the actuator 1. The actuator 1 comprises a housing 11 in which a retainer 12, an armature 13, an armature guide 16 and a restoring spring 14 are arranged. The armature 13 and the armature guide 16 are fixedly connected together. In that case, a translational movement of the armature guide 16 or of the armature 13 itself is predetermined by the housing 11.

In a preferred embodiment the retainer 12 is constructed as an electromagnet and the armature is made of a ferromagnetic material. The retainer 12 can thus exert a magnetic attraction force on the armature 13 and retain this in an active rest setting of the actuator 1. This takes place as long as the retainer 12 is supplied with sufficient electrical energy.

Moreover, the armature 13 is connected with a resetting element 15. The resetting element 15 can be designed as, for example, a wire. The resetting element transmits a tension force F1 to the armature 13. In the illustrated example the resetting element 15 is acted on by the tension force F1 via a lever 10. The resetting element 15 can obviously also be acted on directly by the tension force F1. The tension force F1 represents, for example, the trigger force of a safety brake, which force can be stored in a compression spring or predetermined by the action of gravitational force. A retaining force exerted by the retainer 12 on the armature 13, is greater than the tension force F1. The retainer 12 can thus hold the armature 13 in the active rest setting. In the event of interruption of the electrical energy supply of the retainer 12 the actuator 1 adopts a triggered state and the energy stored in the compression spring is released for activation of the safety brake.

The resetting element 15 itself is made of, for example, a shape memory alloy, particularly a nickel-titanium alloy, nitinol alloy, nickel-titanium-copper alloy, copper-zinc alloy, copper-zinc-aluminum alloy, copper-aluminum-nickel alloy, iron-nickel-aluminum alloy, iron-manganese-silicon alloy or zinc-gold-copper alloy. The resetting element 15 is present in a first length at a first temperature T1 or a high-temperature phase and in a second length at a second temperature T2 or a low-temperature phase, in which case the first length is dimensioned to be shorter than the second length. In a first embodiment the alloy of the resetting element 15 is designed in such a way that the temperature T1 lies above an ambient temperature and the temperature T2 lies in the region of the ambient temperature. Conversely, in a second embodiment the alloy of the resetting element is designed in such a way that the temperature T1 lies in the region of the ambient temperature and the temperature T2 lies below the ambient temperature.

The restoring spring 14 exerts a restoring force on the armature 13 or the resetting element 15. The resetting element 15 can be kept tensioned in its second length by means of this restoring force. The restoring force of the restoring spring is set to be less than the tension force F1 so that, for example, in a triggered state of the actuator 1 the safety brake is reliably activated.

A complete cycle of the functioning of the actuator 1 is shown in FIGS. 2a, 2b and 2c. FIG. 2a shows the actuator 1 in an activated state. This state is distinguished by the fact that the armature 13 is held in an active rest position against the tension force F1 by the retainer 12. In that case, the resetting element 15 adopts a first temperature T1 at which the resetting element 15 is present in its first length. The resetting element 15 in a first embodiment is kept at the first temperature T1 by means of a heat source 17 (see FIG. 1). In a particularly simple embodiment the resetting element 15 is itself designed as a heat source in that it is integrated as a resistor in an electrical circuit. The temperature of the resetting element 15 is in that case set by way of the current density flowing through the resistor or the resetting element 15. Obviously, use can be made of any heat source mentioned in the introduction or other suitable heat source to keep the resetting element 15 at least at the first temperature T1.

As an alternative thereto in a second embodiment of the resetting element 15 the temperature T1 lies in the region of the ambient temperature. In that case the resetting element 15 adopts its first length without a heat source.

The actuator 1 is triggered in the first step A. This takes place through interruption of the energy supply of the retainer 12 on the basis of a signal of a control unit, which indicates an unsafe state of the elevator installation. Since in this state the retaining force of the retainer 12 is cancelled, the armature 13 is released from the retainer due to the prevailing tension force F1, and adopts a predetermined spacing d from the retainer 12. The spacing d is determinable by suitable dimensioning of the housing 11, the armature guide 16 and/or the restoring spring 15. The resetting element 15 is preferably kept at the first temperature T1 during this step.

FIG. 2b shows the actuator 1 in a triggered state.

In the second step B the resetting element 15 is brought from the first temperature T1 to a second temperature T2 in which the resetting element 15 adopts a second length. In that case, in the first embodiment of the resetting element 15 the heat source is switched off, thus, for example, the current across the resetting element 15 is interrupted. As a consequence, the resetting element 15 takes on the ambient temperature. In this embodiment, cooling of the resetting element 15 to the ambient temperature is sufficient to achieve the second temperature T2.

Alternatively thereto the resetting element 15 in its second embodiment can be cooled from the ambient temperature to the second temperature T2 by means of a cooling source 18 (see FIG. 1). For example, the resetting element 15 can be brought into contact with a cool medium such as liquid nitrogen. Any cooling source mentioned in the introduction or other suitable cooling source can obviously be used in order to bring the resetting element 15 at least to the second temperature T2.

During the step B the resetting element 15 expands or takes on the second length in such a way that the spacing d between the armature 13 and the retainer 12 can be overcome. The armature 13 is reset in the direction of the retainer 12 by means of the restoring spring 14 until the armature 13 enters the effective region of the retainer 12. In that case, the retainer 12 is again supplied with energy and exerts a magnetic attraction force on the armature 13.

FIG. 2c shows the actuator 1 in a state in which this is ready for resetting. In particular, thanks to the second length of the resetting element 15 the armature 13 is in operative contact with the retainer 12.

Finally, in a third step C the resetting element 15 is brought to the first temperature T1 in that, for example, the heat source is activated or alternatively the cooling source is switched off. On achieving the temperature T1, the resetting element 15 takes on the first length and shortens by the spacing d. The actuator 1 is accordingly reset to the activated state. The force applied in the case of change in length of the resetting element is greater than the tension force F1.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An actuator for an elevator installation, which actuator can adopt an activated state and a triggered state, with a resetting element for bringing the actuator from the triggered state to the activated state, comprising:

the resetting element being made from a shape memory alloy and takes on a first length at a first temperature and a second length at a second temperature, wherein the resetting element changes, after a triggering of the actuator, from the first length to the second length and back to the first length to reset the actuator to the activated state;

a retainer;

an armature, wherein the armature in the activated state of the actuator is retained at the retainer against a tension force, the resetting element transmits the tension force to the armature, and a length of the resetting element is variable so that the armature after the triggering of the actuator is brought back into operative contact with the retainer; and a restoring spring bringing the armature into the operative contact with the retainer.

2. The actuator according to claim 1 wherein the first length is shorter than the second length.

3. The actuator according to claim 1 wherein the resetting element is formed as wire.

4. The actuator according to claim 1 wherein the retainer retains the armature magnetically and the armature is formed of a ferromagnetic material.

5. The actuator according to claim 1 wherein the retainer retains the armature electromechanically.

6. The actuator according to claim 1 wherein the armature in the triggered state of the actuator is releasable from the retainer in a direction of the tension force.

7. The actuator according to claim 1 wherein a restoring force applied by the restoring spring is lower than the tension force.

8. The actuator according to claim 1 wherein the first temperature is higher than the second temperature, wherein the first length of the resetting element is achievable by heating the resetting element and wherein the first temperature lies above an ambient temperature.

9. The actuator according to claim 8 wherein the ambient temperature is 50° C.

10. The actuator according to claim 8 including a heat source for heating the resetting element, the heat source being one of an induction coil in which the resetting element is arranged, a heating coil in which the resetting element is arranged, connection of the resetting element as a resistor into a current circuit, and a medium able to be brought into contact with the resetting element.

11. The actuator according to claim 1 wherein the first temperature is higher than the second temperature, wherein the second length of the resetting element is achievable by cooling the resetting element and wherein the second temperature lies below an ambient temperature.

12. The actuator according to claim 11 wherein the ambient temperature is below −10° C.

13. The actuator according to claim 11 including a cooling source for cooling the resetting element, the cooling source being one of a Peltier element connected with the resetting element, and a medium able to be brought into contact with the resetting element.

14. The actuator according to claim 1 wherein the armature is connected with an armature guide by which the armature is guided within a housing for a translational guidance of the armature.

15. A method for actuating an actuator for an elevator installation, which actuator can adopt an activated state and a triggered state, with a resetting element for bringing the actuator from the triggered state to the activated state, comprising the steps of:

providing the actuator, the actuator including:
  the resetting element, the resetting element being made from a shape memory alloy that takes on a first length at a first temperature and a second length at a second temperature;
  a retainer;
  an armature, wherein the armature in the activated state of the actuator is retained at the retainer against a tension force, the resetting element transmits the tension force to the armature, and a length of the resetting element is variable so that the armature after the triggering of the actuator is brought back into operative contact with the retainer; and
  a restoring spring bringing the armature into the operative contact with the retainer;

triggering the actuator to adopt the triggered state;

extending the resetting element to the second length at the second temperature; and shortening the resetting element to the first length at the first temperature to reset the actuator from the triggered state to the activated state.

* * * * *